Dec. 18, 1951     F. H. FUJITA     2,578,793
PICKING CART
Filed Nov. 18, 1949

INVENTOR

FRANK H. FUJITA

BY
McMorrow, Berman & Davidson
ATTORNEY

Patented Dec. 18, 1951

2,578,793

UNITED STATES PATENT OFFICE 2,578,793

PICKING CART

Frank H. Fujita, Watsonville, Calif.

Application November 18, 1949, Serial No. 128,126

2 Claims. (Cl. 280—58)

This invention relates to a picking cart, and more particularly to such a cart which supports a crate for receiving berries as they are picked.

An object of this invention is to provide a picking cart which may be wheeled about a patch containing berry-bearing plants without damaging the plants.

Another object of this invention is to provide a picking cart which supports a crate for the picked berries in an inclined position.

A further object of this invention is to provide a picking cart which is in an easily accessible position during the entire picking operation.

A still further object of this invention is to provide a picking cart which is of a light and durable structure, so that it is readily portable.

Other objects of this invention will become apparent upon consulting the drawings in conjunction with the following specification.

Figure 1:
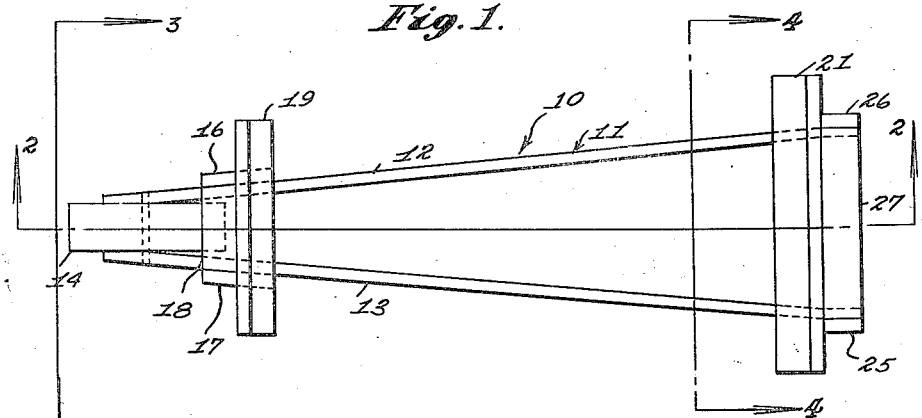
Figure 1 is a top plan view of the picking cart of the present invention.
Figure 2:
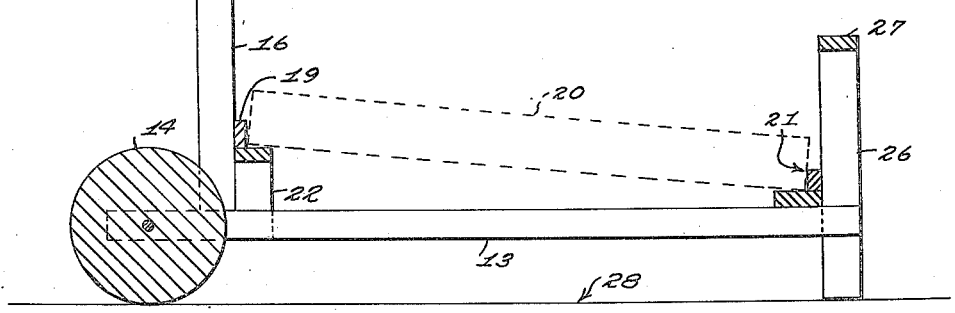
Figure 2 is a longitudinal sectional view taken along the line 2—2 of Figure 1.
Figures 3, 4:
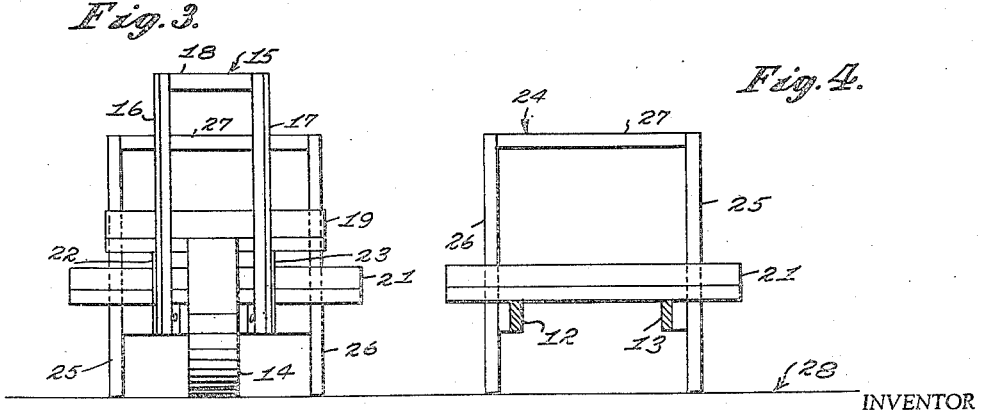
Figure 3 is an end elevational view taken along the line 3—3 of Figure 1.
Figure 4 is an end elevational view taken along the line 4—4 of Figure 1.

Referring now more specifically to the drawings, wherein like reference numerals have been utilized throughout the several views to designate like parts, there is shown the picking cart of the present invention which is preferably employed for picking strawberries, said cart being generally indicated by the numeral 10. The cart 10 includes the frame, generally indicated by the numeral 11, comprising a pair of horizontally disposed side pieces 12, 13 arranged in divergent, spaced relation with respect to each other. Positioned adjacent the end of the frame remote from the divergent ends of the side pieces 12, 13 and rotatably supported therein is a wheel 14 for movement along a ground surface 28. Positioned rearwardly of the wheel 14 and fixedly secured to the side pieces 12, 13 is a vertically disposed support 15. As clearly shown in Figure 3, the support 15 includes a pair of spaced apart posts 16, 17 having their lower ends fixedly secured to the side pieces 12, 13 and a horizontally disposed handle bar 18 fixedly secured intermediate the upper ends of the posts 16, 17. Fixedly positioned transversely of the posts 16, 17 and spaced above the side pieces 12, 13 by means of a pair of spacer bars 22, 23 is a rest 19. Positioned in parallel, spaced facing relation with respect to the rest 19 and fixedly secured to the side pieces 12, 13 is another rest 21. The rests 19 and 21 cooperate with each other to support a crate 20 in an inclined position, with respect to the side pieces 12, 13.

Positioned rearwardly of the rest 21 and fixedly secured to the adjacent portions of the side pieces 12, 13 is another vertically disposed support 24. As clearly shown in Figure 4, the support 24 includes a pair of vertically disposed posts 25, 26 having their lower ends resting upon the ground surface 28. The posts 25, 26 are fixedly secured intermediate their ends to the adjacent ones of the side pieces 12, 13 of the frame 11. Positioned intermediate the upper ends of the posts 25, 26 and fixedly secured thereto is a second horizontally disposed handle bar 27.

In actual use, the crate 20 for the reception of the berries is supported in its inclined position longitudinally of the cart 10. As the picking cart 10 is moved in the patch, the crate 20 is partially or completely filled with berries. When the picking is completed, the partially or completely filled crate may be carried from place to place by grasping the first handle bar 18 and the second handle bar 27 and lifting. When unloaded, the cart 10 may be easily moved from place to place by grasping the handle bar 18 and lifting. The simplicity of the structure of the cart 10 permits it to be wholly or partially fabricated of wood, such that it is light in weight for easy portability, very durable, and cheap to manufacture.

Although only one embodiment of the present invention has been described, numerous modifications can be made without departing from the spirit of the invention as recited in the appended claims.

What I claim is:

1. A picking cart comprising a horizontally disposed frame, a wheel positioned adjacent one end of said frame and rotatably supported thereon for movement along a ground surface, a first vertically disposed support embodying a pair of spaced upstanding posts and a horizontally disposed handle bar connecting the upper ends of said posts arranged rearwardly of said wheel and having the lower ends of said posts fixedly secured to said frame, a second vertically disposed support embodying a pair of spaced upstanding posts and a horizontally disposed handle bar connecting the upper ends of said posts arranged adjacent the other end of said frame and having the posts intermediate the upper and lower ends fixedly secured to said frame with the lower ends of said posts adapted to rest on the ground surface, a first rest positioned transversely of and spaced above said frame rearwardly of said posts of said first support and fixedly supported by said frame, and a second rest positioned above said frame inwardly of said second support and in parallel spaced relation with respect to said first rest and fixedly secured to said frame, said first rest being spaced at a greater distance from said frame than said second named rest, said rests cooperating with each other to support a crate in an inclined position.

2. A picking cart comprising a pair of horizontally disposed side pieces arranged in divergent spaced relation, a wheel positioned intermediate the ends of said side pieces remote from the divergent ends thereof and rotatably supported in said side pieces for movement along a ground surface, a first vertically disposed support embodying a pair of spaced upstanding posts and a horizontally disposed handle bar connecting the upper ends of said posts arranged rearwardly of said wheel and having the lower ends of said posts fixedly secured to said pieces, a second vertically disposed support embodying a pair of spaced upstanding posts and a horizontally disposed handle bar connecting the upper ends of said posts arranged adjacent the divergent ends of said pieces and having the posts intermediate the upper and lower ends fixedly secured to said pieces with the lower ends of said posts adapted to rest on the ground surface, a first rest positioned transversely of and spaced above said pieces rearwardly of said posts of said first support and fixedly supported by said pieces, and a second rest positioned above said pieces inwardly of said second support and in parallel spaced relation with respect to said first rest and fixedly secured to said pieces, said first rest being spaced at a greater distance from said pieces than said second named rest, said rests cooperating with each other to support a crate in an inclined position.

FRANK H. FUJITA.

REFERENCES CITED

The following references are of record in the file of this patent:

UNITED STATES PATENTS

| Number | Name | Date |
|---|---|---|
| 689,932 | Tucker | Dec. 31, 1901 |
| 2,035,535 | Colmorgen | Mar. 31, 1936 |

FOREIGN PATENTS

| Number | Country | Date |
|---|---|---|
| 580,222 | Great Britain | Aug. 30, 1946 |